United States Patent
Capaldo et al.

(10) Patent No.: US 7,251,079 B2
(45) Date of Patent: Jul. 31, 2007

(54) BRIGHTNESS ENHANCEMENT FILM, AND METHODS OF MAKING AND USING THE SAME

(75) Inventors: Kevin Patrick Capaldo, Mount Vernon, IN (US); Brian Thomas Carvill, Grayslake, IL (US); Dennis Joseph Coyle, Clifton Park, NY (US); Yu Hu, Evansville, IN (US); Chunghei Yeung, Evansville, IN (US); Yan Zhang, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/326,158

(22) Filed: Jan. 4, 2006

(65) Prior Publication Data

US 2006/0114569 A1 Jun. 1, 2006

Related U.S. Application Data

(63) Continuation-in-part of application No. 10/937,941, filed on Sep. 10, 2004, now abandoned, and a continuation-in-part of application No. 10/787,158, filed on Feb. 27, 2004.

(60) Provisional application No. 60/451,342, filed on Feb. 28, 2003.

(51) Int. Cl.
    *G02B 27/30* (2006.01)
(52) U.S. Cl. .................................................. 359/641
(58) Field of Classification Search ........ 359/619–620, 359/599, 641
    See application file for complete search history.

(56) References Cited

U.S. PATENT DOCUMENTS

| 1,591,572 A | 7/1926 | Stimson |
| 1,671,086 A | 5/1928 | Stimson |
| 1,807,350 A | 5/1931 | Stimson |

(Continued)

FOREIGN PATENT DOCUMENTS

DE          3408709 A       9/1985

(Continued)

OTHER PUBLICATIONS

International Search Report, International Application No. PCT/US2005/031669, International Filing Date: Jul. 9, 2005, Date of Mailing Feb. 3, 2006, 5 pages.

(Continued)

*Primary Examiner*—Alicia M Harrington
(74) *Attorney, Agent, or Firm*—Cantor Colburn LLP

(57) ABSTRACT

In one embodiment, a brightness enhancement film comprises: a diffusing film comprising a front surface and a back surface, a coating on the front surface, and light redirecting structures disposed in the coating. The brightness enhancement film is capable of collimating light, and wherein, without the coating, the diffusing film would be capable of spread light passing through the back surface. In another embodiment, the brightness enhancement film comprises: a diffusing film comprising a front surface and a back surface, a coating on the front surface, and light redirecting structures disposed in the coating. The diffusing film has a stress retardation gradient of less than or equal to 50 nm/in, wherein an interval for calculation of the stress retardation gradient is less than 1 inch. The brightness enhancement film is capable of collimating light.

25 Claims, 7 Drawing Sheets

U.S. PATENT DOCUMENTS

| | | | |
|---|---|---|---|
| 1,906,655 A | 5/1933 | Stimson | |
| 3,712,706 A | 1/1973 | Stamm | |
| 3,924,929 A | 12/1975 | Holmen et al. | |
| 4,073,568 A | 2/1978 | Heasley | |
| 4,198,465 A | 4/1980 | Moore et al. | 428/409 |
| 4,208,090 A | 6/1980 | Heenan | |
| 4,275,091 A | 6/1981 | Lippits et al. | 427/53.1 |
| 4,349,598 A | 9/1982 | White | |
| 4,351,920 A | 9/1982 | Ariga et al. | 525/67 |
| 4,363,844 A | 12/1982 | Lewis et al. | 428/65 |
| 4,519,065 A | 5/1985 | Lewis et al. | 369/275 |
| 4,542,449 A | 9/1985 | Whitehead | 362/330 |
| 4,576,850 A | 3/1986 | Martens | 428/156 |
| 4,601,861 A | 7/1986 | Pricone et al. | |
| 4,618,518 A | 10/1986 | Pricone et al. | |
| 4,703,999 A | 11/1987 | Benson | |
| 4,721,377 A | 1/1988 | Fukuda et al. | |
| 4,790,893 A | 12/1988 | Watkins | 156/232 |
| 4,791,540 A | 12/1988 | Dreyer, Jr. et al. | 362/331 |
| 4,799,131 A | 1/1989 | Aho et al. | 362/61 |
| 4,801,193 A | 1/1989 | Martin | |
| 4,812,032 A | 3/1989 | Fukuda et al. | |
| 4,883,341 A | 11/1989 | Whitehead | 350/267 R |
| 4,895,428 A | 1/1990 | Nelson et al. | |
| 4,943,380 A | 7/1990 | Sugiura et al. | 252/8.7 |
| 4,946,531 A | 8/1990 | Crouch et al. | 156/242 |
| 4,984,144 A | 1/1991 | Cobb, Jr. et al. | 362/339 |
| 5,056,892 A | 10/1991 | Cobb, Jr. | 359/831 |
| 5,161,041 A | 11/1992 | Abileah et al. | 359/40 |
| 5,175,030 A | 12/1992 | Lu et al. | 428/30 |
| 5,183,597 A | 2/1993 | Lu | 264/1.4 |
| 5,213,872 A | 5/1993 | Pricone et al. | |
| 5,242,630 A | 9/1993 | Nuij et al. | 264/1.3 |
| 5,271,968 A | 12/1993 | Coyle et al. | 427/558 |
| 5,284,435 A | 2/1994 | Nuij et al. | 425/385 |
| 5,424,339 A | 6/1995 | Zanka et al. | 522/168 |
| 5,455,105 A | 10/1995 | Coyle et al. | 428/215 |
| 5,468,542 A | 11/1995 | Crouch | 428/215 |
| 5,626,800 A | 5/1997 | Williams et al. | 264/1.38 |
| 5,635,278 A | 6/1997 | Williams | 428/172 |
| 5,771,328 A | 6/1998 | Wortman et al. | 385/146 |
| 5,828,488 A | 10/1998 | Ouderkirk et al. | 359/487 |
| 5,855,983 A | 1/1999 | Williams | 428/172 |
| 5,858,139 A | 1/1999 | Ouderkirk et al. | 156/60 |
| 5,891,931 A | 4/1999 | Leboeuf et al. | 522/64 |
| 5,900,287 A | 5/1999 | Williams | 427/510 |
| 5,908,874 A | 6/1999 | Fong et al. | 522/74 |
| 5,917,664 A | 6/1999 | O'Neill et al. | 359/831 |
| 5,919,551 A | 7/1999 | Cobb, Jr. et al. | 428/156 |
| 5,932,626 A | 8/1999 | Fong et al. | 522/182 |
| 5,981,113 A | 11/1999 | Christian | 430/9 |
| 6,005,137 A | 12/1999 | Moore et al. | 560/139 |
| 6,007,888 A | 12/1999 | Kime | 428/64.1 |
| 6,025,897 A | 2/2000 | Weber et al. | 349/96 |
| 6,052,164 A | 4/2000 | Cobb, Jr. et al. | 349/64 |
| 6,059,003 A | 5/2000 | Wittkopf | 156/555 |
| 6,091,547 A | 7/2000 | Gardiner et al. | 359/625 |
| 6,096,247 A | 8/2000 | Ulsh et al. | 264/2.7 |
| 6,107,364 A | 8/2000 | Fong et al. | 522/182 |
| 6,120,636 A | 9/2000 | Nilsen et al. | |
| 6,194,497 B1 | 2/2001 | Willems et al. | 524/165 |
| 6,261,700 B1 | 7/2001 | Olson et al. | 428/522 |
| 6,280,063 B1 | 8/2001 | Fong et al. | 362/333 |
| 6,291,070 B1 | 9/2001 | Arpac et al. | 428/412 |
| 6,313,187 B2 | 11/2001 | LeBoeuf et al. | 522/13 |
| 6,329,485 B1 | 12/2001 | Vanderbilt | 526/318.1 |
| 6,375,776 B1 | 4/2002 | Buoni et al. | |
| 6,514,594 B1 | 2/2003 | Wei et al. | |
| 6,577,446 B2 | 6/2003 | Kumazawa et al. | |
| 6,592,988 B1 | 7/2003 | Thompson et al. | 428/375 |
| 6,663,978 B1 | 12/2003 | Olson et al. | |
| RE38,530 E | 6/2004 | Willems et al. | 524/154 |
| 6,833,176 B2 | 12/2004 | Chisholm et al. | |
| 7,045,558 B2 | 5/2006 | Chisholm et al. | |
| 2002/0114922 A1 | 8/2002 | Bourne et al. | 428/141 |
| 2002/0114923 A1 | 8/2002 | Lilly | 428/141 |
| 2002/0123589 A1 | 9/2002 | Olson et al. | |
| 2003/0099808 A1 | 5/2003 | Coyle et al. | 428/64.4 |
| 2003/0108710 A1 | 6/2003 | Coyle et al. | 428/64.4 |
| 2003/0127770 A1 | 7/2003 | Xi et al. | 264/175 |
| 2003/0162871 A1 | 8/2003 | Saito | 524/148 |
| 2003/0211320 A1 | 11/2003 | Thompson et al. | 428/375 |
| 2003/0214728 A1 | 11/2003 | Olczak | 359/707 |
| 2004/0005451 A1 | 1/2004 | Kretman et al. | |
| 2004/0066645 A1 | 4/2004 | Graf et al. | 362/31 |
| 2004/0109305 A1 | 6/2004 | Chisholm et al. | |
| 2004/0109663 A1 | 6/2004 | Olczak | 385/146 |
| 2004/0132858 A1 | 7/2004 | Chisholm et al. | |
| 2004/0141103 A1 | 7/2004 | Kotchick et al. | |
| 2004/0228141 A1 | 11/2004 | Hay et al. | 362/555 |
| 2004/0242720 A1 | 12/2004 | Chisholm et al. | |

FOREIGN PATENT DOCUMENTS

| | | |
|---|---|---|
| WO | WO 98/59265 | 12/1998 |
| WO | WO 00/26274 | 5/2000 |
| WO | WO 00/69945 | 11/2000 |
| WO | WO 01/27527 | 4/2001 |
| WO | WO 01/27663 | 4/2001 |

OTHER PUBLICATIONS

Chunghe, et al. "Light Management Film and Its Preparation and Use". U.S. Appl. No. 10/937,942. Filed Sep. 10, 2004.

Chisholm, et al. "Metal Oxide Nanoparticles, Methods of Making, and Methods of Use". U.S. Appl. No. 10/652,812. Filed Aug. 29, 2003.

Pickett, et al. "High Refractive Index, UV-Curable Monomers and Coating Compositions Prepared Therefrom" U.S. Appl. No. 10/897,364. Filed Jul. 21, 2004.

Hay et al., U.S. Appl. No. 10/435,233. Filed May 9, 2003. Entitled "Light Management Films and Articles Thereof". pp. 1-30.

L.L. Beecroft, et al. "High Refractive Index Polymers for Optical Applications". J.M.S.-Pure Appl. Chem., A34(4), pp. 573-586- (1997).

Chunghei, Yeung, et al. U.S. Appl. No. 10/937,942 "Light Management Film and its Preparation and Use". Filed on Sep. 10, 2004. Pages 1-42.

Ambrose, et al. "Optical Film, Light-Diffusing Film, and Methods of Making and Using the Same" Serial No. 10/895,787. Filed Jul. 20, 2004.

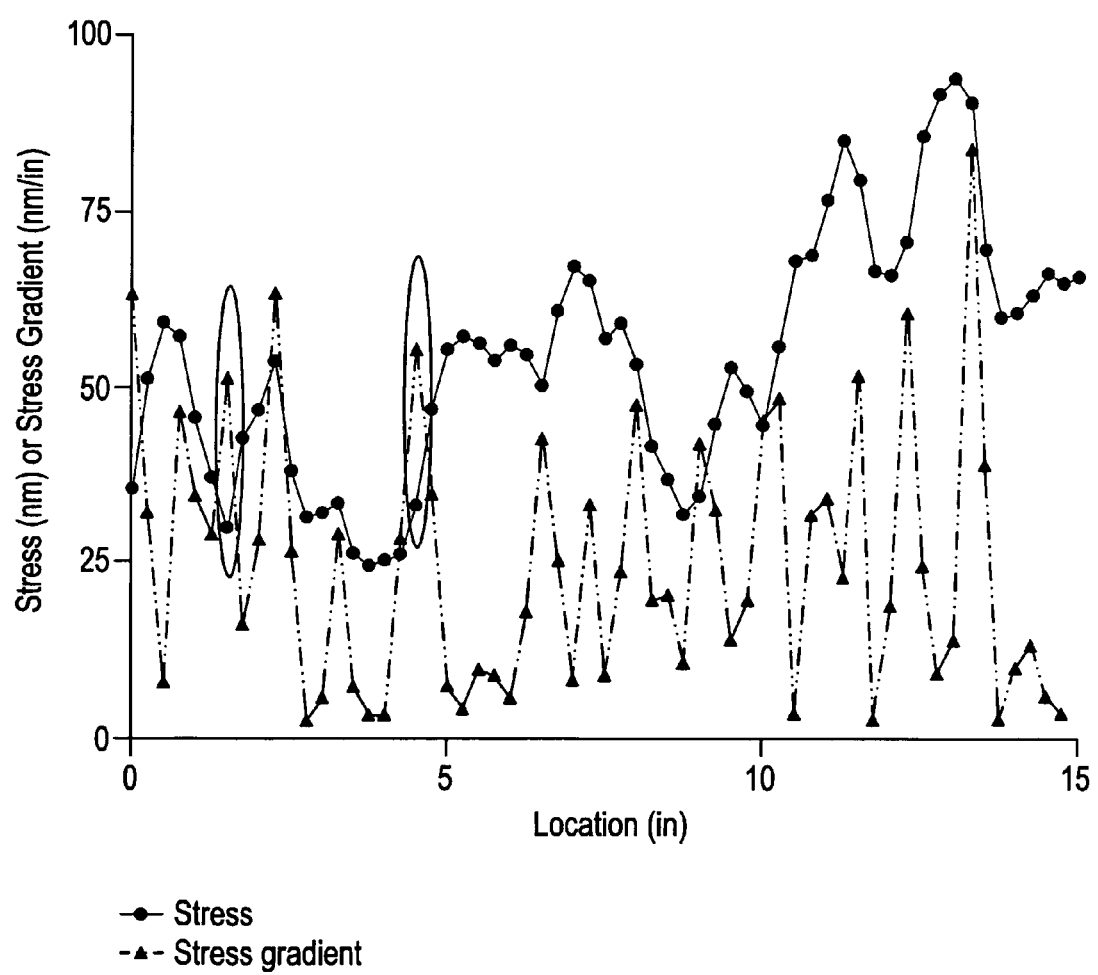

BRIGHTNESS ENHANCEMENT FILM, AND METHODS OF MAKING AND USING THE SAME

CROSS REFERENCE TO RELATED APPLICATIONS

This application is a continuation-in-part of U.S. application Ser. No. 10/937,941, filed Sep. 10, 2004, now abandoned and U.S. application Ser. No. 10/787,158 filed Feb. 27, 2004, which claims priority to U.S. Provisional Application No. 60/451,342, filed Feb. 28, 2003, which are incorporated herein by reference.

BACKGROUND

In flat panel displays (e.g., backlight computer displays), optical film (which can also be referred to as a sheet, layer, foil, and the like) materials are commonly used, for example, to direct, diffuse, or polarize light. For example, in backlight displays, brightness enhancement films collimate light using prismatic structures on the surfaces thereof to direct the light along a viewing axis (i.e., an axis normal (perpendicular) to the display). This enhances the brightness of the light viewed by the user of the display and allows the system to consume less power in creating a desired level of on-axis illumination. Such films can also be used in a wide range of other optical designs, such as in projection displays, traffic signals, and illuminated signs.

Brightness enhancing display films generally termed "prism sheets" comprises a series of prisms disposed upon a film. FIG. 1 is an exemplary depiction of the series of prisms disposed upon a film. Each brightness enhancing display film comprises a prism surface and a back surface. The prism surface of the brightness enhancing display film is the surface that comprises the upper surfaces (the air contacting surfaces) of the prisms. The back surface of the brightness enhancing display film is the surface opposed to the prism surface. The back surface is generally flat and is parallel to the base of the prisms that are disposed upon the film substrate as shown in the FIG. 1. It is desirable for the brightness enhancing display film to collimate most of the light incident upon the back surface of the film substrate in the on-axis direction. As can be seen in the FIG. 1, the on-axis brightness is the brightness measured in a direction perpendicular to the back surface of the brightness enhancing display film.

Currently, backlight displays, for example, employ a plurality of films arranged in a manner to obtain the desired brightness and diffusion of the light directed to the viewer. It is noted that as the number of films employed increases, the overall thickness of the backlight display increases. It is noted, however, that consumers are increasingly demanding thinner backlight display devices. Moreover, it is also desirable to eliminate color bands that may be observable in the back light display device to further meet consumer demands. If the film changes the polarization state of the light differently point-to-point, then that light passes through the polarizing films differently point-to-point such that the viewer sees color-bands or stripes of different color (e.g., shades of grey).

Since a demand exists for increasingly thinner backlight display devices, what is needed in the art is a multifunctional brightness enhancement film with no visible color bands. Color bands manifest as patterned variations in brightness or color of the final display and are often seen best when the display is viewed at a glancing angle. These color effects are often the results of stresses in the films that make up the display. When there are stresses in a plastic film, the plastic molecules tend to orient. The most common way of quantifying these types of stresses utilizes the fact that light polarized in the direction of molecular orientation travels through the plastic at a slightly different speed then light that is polarized perpendicular to the molecular orientation. The retardation of the slower light orientation relative to the faster light orientation can be quantified as the distance by which the wave phase has shifted. We refer to this measurement as the stress retardation.

SUMMARY

Disclosed herein are brightness enhancement films, methods of making and using the same, and articles made therefrom.

In one embodiment, a brightness enhancement film comprises: a diffusing film comprising a front surface and a back surface, a coating on the front surface, and light redirecting structures disposed in the coating. The brightness enhancement film is capable of collimating light, and wherein, without the coating, the diffusing film would be capable of spread light passing through the back surface.

In another embodiment, the brightness enhancement film comprises: a diffusing film comprising a front surface and a back surface, a coating on the front surface, and light redirecting structures disposed in the coating. The diffusing film has a stress retardation gradient of less than or equal to 50 nm/in, wherein an interval for calculation of the stress retardation gradient is less than 1 inch. The brightness enhancement film is capable of collimating light.

In yet another embodiment, the brightness enhancement film comprises: a diffusing film comprising a front surface, a back surface, and a diffusing film refractive index, a coating on the front surface, wherein the coating has a coating refractive index, and light redirecting structures disposed in the coating. The front surface comprises an average surface roughness (Ra) of greater than or equal to about 0.2 micrometers. The brightness enhancement film is capable of collimating light. A difference in the diffusing film refractive index and the coating refractive index is less than or equal to about ±0.2.

In one embodiment, a display device comprises: the brightness enhancement film, an optical source, and a light guide in optical and physical communication with the optical source.

In one embodiment, the method of making a brightness enhancement film, comprises: melting a thermoplastic resin at a temperature greater than or equal to a glass transition temperature of the thermoplastic resin, extruding the thermoplastic resin into a gap between a first calendering roll and a second calendering roll, cooling the thermoplastic resin to a temperature below the glass transition temperature to produce a diffusing film, disposing a coating on a front surface of the diffusing film, disposing a light-redirecting structures into the coating; and curing the coating.

In another embodiment, a method of making a brightness enhancement film, comprises: melting a thermoplastic resin at a temperature greater than or equal to a glass transition temperature of the thermoplastic resin, extruding the thermoplastic resin into a gap between a first calendering roll and a second calendering roll, cooling the thermoplastic resin to a temperature below the glass transition temperature to produce a diffusing film, disposing a coating on a front surface of the diffusing film, disposing a light-redirecting structures into the coating; and curing the coating. A stress retardation gradient across the diffusing film is less than or equal to 50 nanometers per inch, wherein an interval for calculation of the stress retardation gradient is less than 1 inch.

The above described and other features will be appreciated and understood from the following detailed description, drawings, and appended claims.

BRIEF DESCRIPTION OF THE DRAWINGS

Refer now to the figures, which are exemplary embodiments, and wherein the like elements are numbered alike.

FIG. 9 is a graphical illustration of stress gradient and stress versus location.

DETAILED DESCRIPTION

Disclosed herein are optical films, more particularly brightness enhancement films capable of being employed in a flat panel display (e.g., a backlight display device). It is noted that the brightness enhancement films can be a single layer (e.g., a unitary or monolithic film characterized by the absence of coatings) or a multi-layered structure. Brightness enhancement films comprise light-reflecting elements (e.g., retroreflective elements). Possible light-reflecting elements include cube-corners (e.g., triangular pyramid), trihedral, hemispheres, prisms, ellipses, tetragonal, grooves, channels, microlenses, and others, as well as combinations comprising at least one of the foregoing.

Several embodiments of backlight display devices are discussed hereunder with reference to individual drawing figures. One of skill in the art will easily recognize that many of the components of each of the embodiments are similar or identical to the others. Each of these elements is introduced in the discussion of FIG. 2, but is not repeated for each embodiment. Rather, distinct structure is discussed relative to each figure/embodiment.

Figure 1:
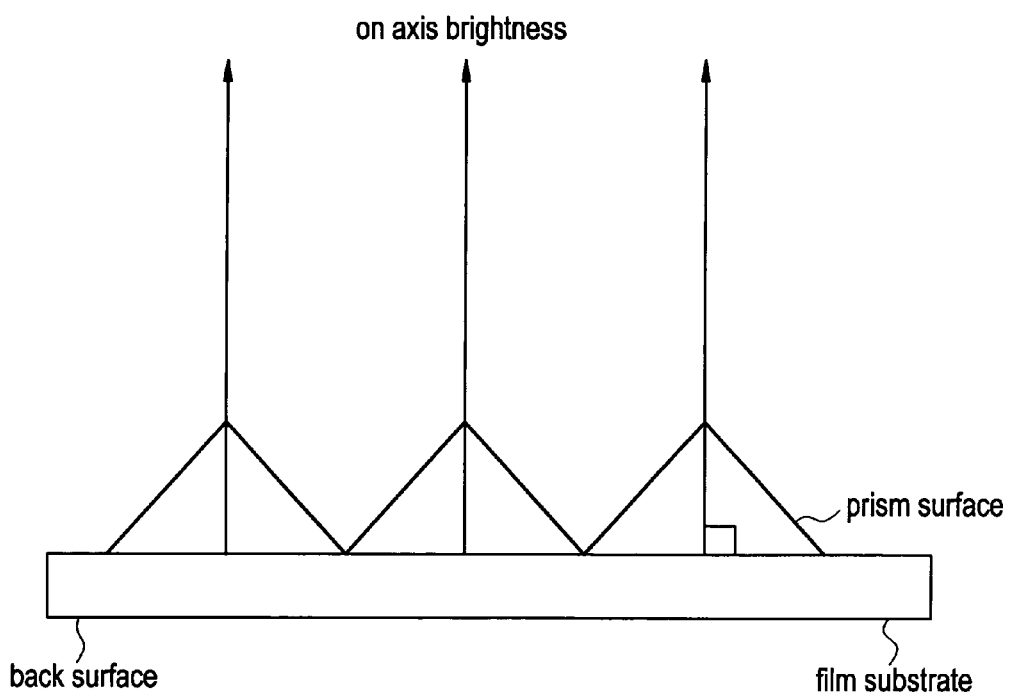
FIG. 1 is a cross-sectional side view of an exemplary portion of a brightness enhancing film depiction illustrating the back surface and the front surface with prisms thereon.
Figure 2:
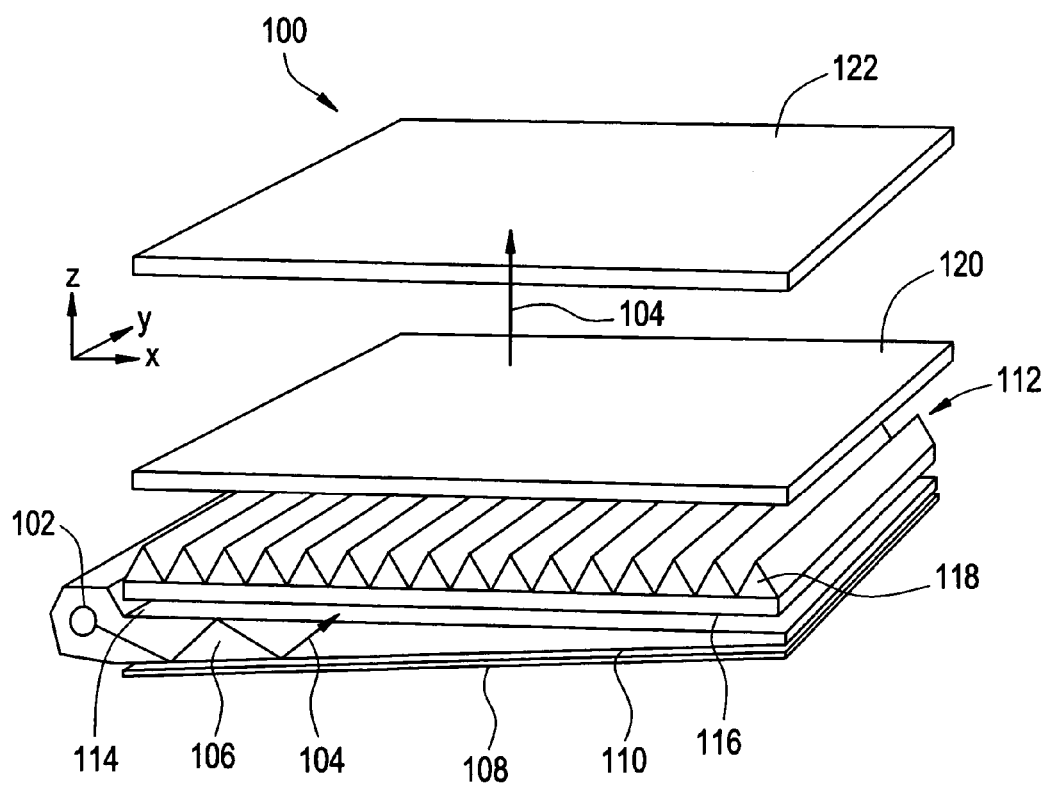
FIG. 2 is a perspective view of an exemplary embodiment of a backlight display device including a brightness enhancement film.

Referring now to FIG. 2, a perspective view of a backlight display device generally designated 100 is illustrated. The backlight display device 100 comprises an optical source 102 for generating light 104. A light guide 106 in optical communication with optical source 102 guides the light 104 by total internal reflection (TIR) of the light 104 within the light guide 106. The term "total" that is used in relation to reflection is used herein to refer to the combined reflectance of all light from a surface. A reflective film 108 in physical and/or optical communication with a first surface 110 of light guide 106 reflects the light 104 out of the light guide 106. A brightness enhancement film 112 located in physical and/or optical communication with a second (or back) surface 114 of light guide 106 receives the light 104 from the light guide 106.

Figure 3:
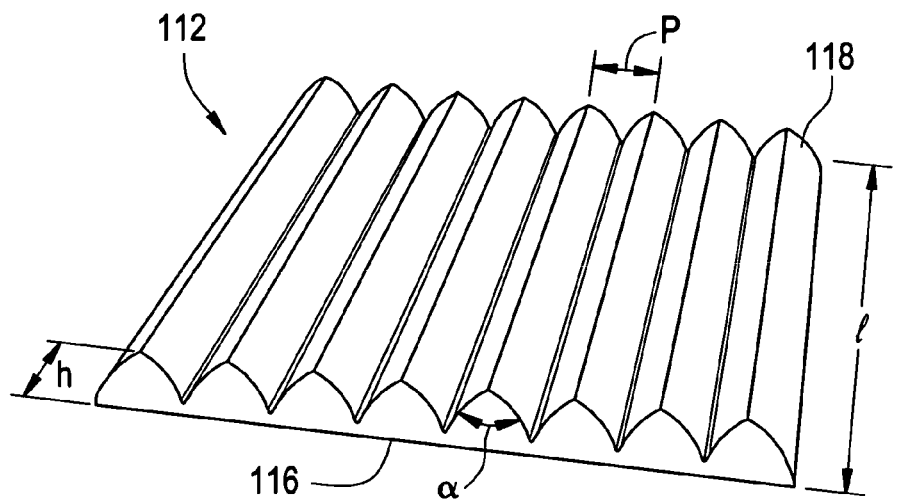
FIG. 3 is a perspective view of an exemplary embodiment of a brightness enhancement film with prismatic surfaces.
Figure 4:
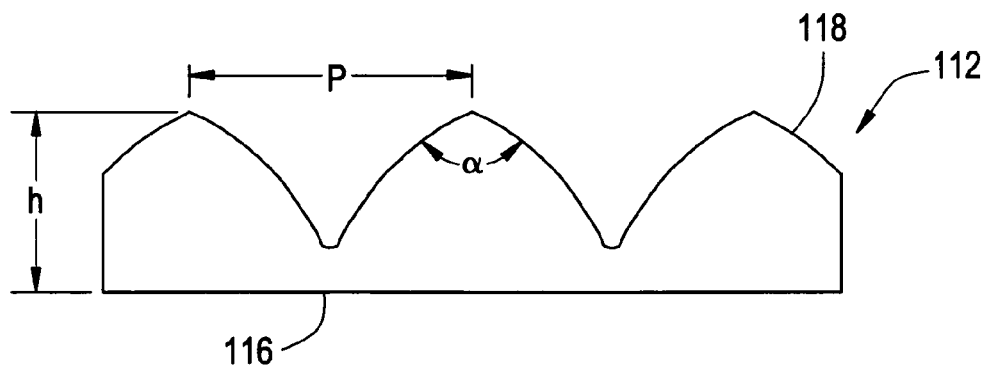
FIG. 4 is a cross-sectional view of the brightness enhancement film of FIG. 2.

More particularly, in this embodiment, the brightness enhancement film 112 comprises a planar surface 116 in physical and/or optical communication with the second surface 114 of light guide 106, and a prismatic surface 118 in physical and/or optical communication with light-diffusing film 120. Still further, it will be appreciated that the prismatic surfaces 118 can comprise a peak angle, α, a height, h, a pitch, p, and a length, l (see FIGS. 3 and 4) such that the structure of the brightness enhancement film 112 can be deterministic, periodic, random, and the like. For example, films with prismatic surfaces with randomized or pseudo-randomized parameters are described for example in U.S. Patent Application Ser. No. 2003/0214728 to Olcazk. Moreover, it is noted that for each prism the sidewalls (facets) can be straight-side, concave, convex, and the like. The peak of the prism can be pointed, rounded, blunted, and the like. More particularly, in an embodiment the prisms comprise straight-sided facets having a pointed peak (e.g., a peak comprising a radius of curvature of about 0.1% to about 30% of the pitch (p)), particularly about 1% to about 5%).

Figure 5:
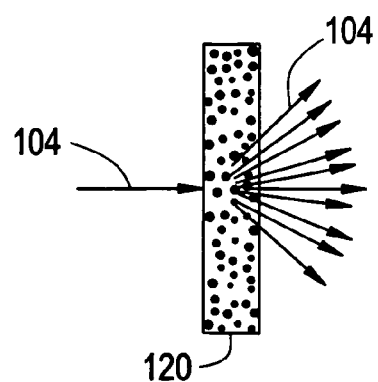
FIG. 5 is a cross-sectional view and schematic illustration of an exemplary embodiment of a light-diffusing film receptive of light and diffusing the light emanating therefrom.

The brightness enhancement film 112 receives the light 104 and acts to direct the light 104 in a direction that is substantially normal to the brightness enhancement film 112 as indicated schematically by an arrow representing the light 104 being directed in a z-direction shown in FIG. 2. The light-diffusing film 120 is receptive of the light 104 from the brightness enhancement film 112 and diffuses (e.g., scatters) the light as illustrated schematically in FIG. 5. The light 104 proceeds from the light-diffusing film 120 to a liquid crystal display (LCD) 122.

Figure 6:
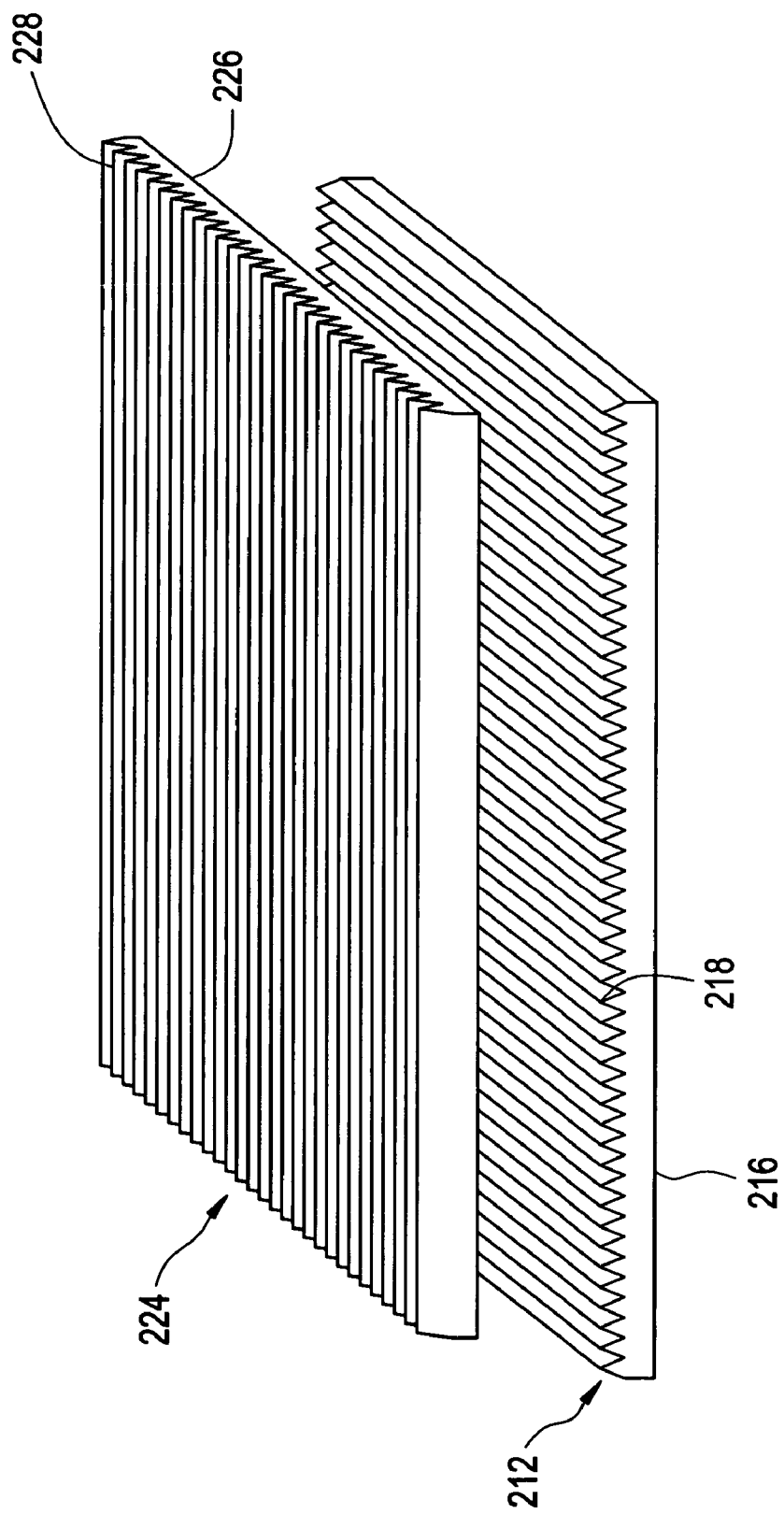
FIG. 6 is a perspective view of an exemplary embodiment of two brightness enhancement films.

Further, it is noted that in various embodiments a backlight display device can comprise a plurality of brightness enhancement films and a plurality of light-diffusing films in optical communication with each other. The plurality of brightness enhancement films and light-diffusing films can be arranged in any configuration to obtain the desired results in the LCD. For example, the plurality of brightness enhancement films can be arranged in physical and/or optical communication with each other as illustrated in FIG. 6. More particularly, a first brightness enhancement film 212 comprises a first brightness enhancement film planar surface 216 and a first brightness enhancement film prismatic surface 218. A second brightness enhancement film 224 comprises a second brightness enhancement film planar surface 226 and a second brightness enhancement film prismatic surface 228. The first brightness enhancement film 212 and the second brightness enhancement film 224 can be arranged such that the prismatic surfaces (218 and 228, respectively) are positioned at an angle with respect to one another, e.g., 90 degrees. Generally, the arrangement and type of brightness enhancement films and light-diffusing films depends on the backlight display device in which they are employed. It is noted, however, that embodiments are envisioned where one or more brightness enhancement films and/or light-diffusing films can be replaced by a single multifunctional brightness enhancement film, as will be discussed in greater detail below.

Additionally, as briefly mentioned above, the arrangement, type, and amount of brightness enhancement film (s) and light-diffusing film(s) depends on the backlight display device in which they are employed. An increasingly common use of a backlight display device is in a laptop computer. While reference is made to a laptop computer throughout this disclosure, it is to be understood that the brightness enhancement films disclosed herein can be employed in other applications without undue experimentation.

Figure 7:
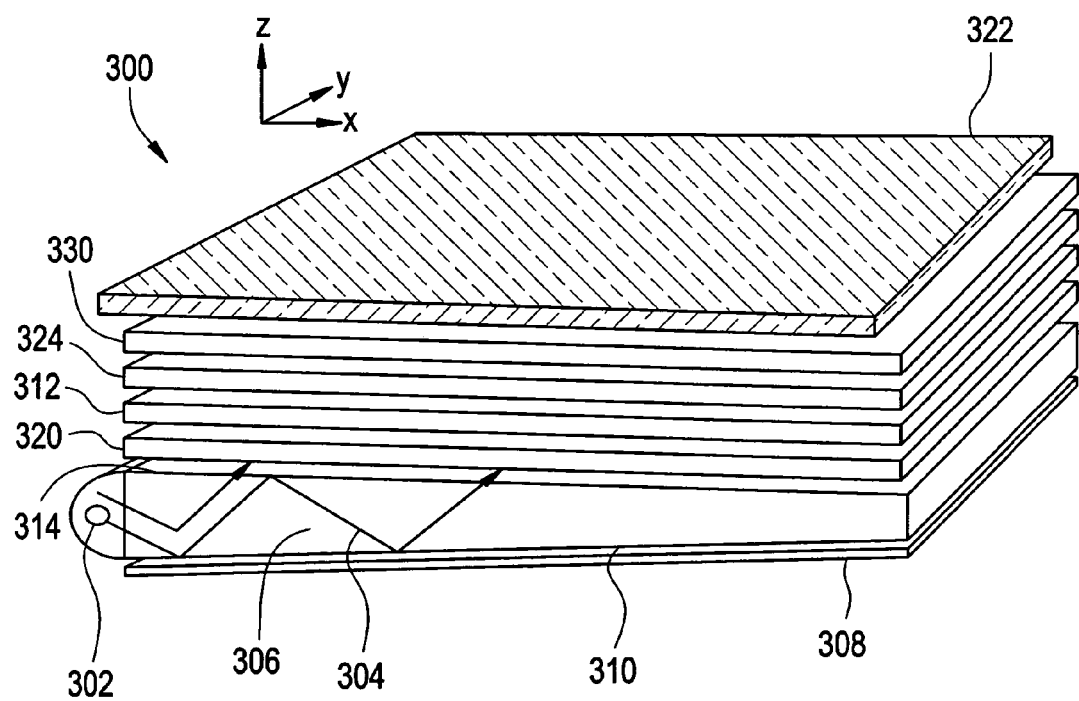
FIG. 7 is a perspective view of an exemplary embodiment of a backlight display device including a plurality of brightness enhancement films and a plurality of light-diffusing films.

An exemplary backlight display device 300 for use in a laptop computer is illustrated in FIG. 7. The backlight display device 300 comprises an optical source 302 for generating light 304. A light guide 306 in optical communication with optical source 302 guides the light 304 by total internal reflection of the light 304, as discussed above in relation to FIG. 2. A reflective film 308 in physical and/or optical communication with a first surface 310 of light guide 306 reflects the light 304 out of the light guide 306. A bottom light-diffusing film 320 and a top light-diffusing film 330 are in optical communication with a first brightness enhancement film 312 and a second brightness enhancement film 324 disposed between the bottom light-diffusing film 320 and the top-diffusing film 330. In an embodiment, the light 304 proceeds from the top light-diffusing film 330 to a liquid crystal display (LCD) 322.

With regards to the embodiment illustrated in FIG. 7, it is noted that the bottom light-diffusing film 320 can primarily function to enhance the uniformity of the light 304. The top light-diffusing film 330 can primarily function to minimize glare and optical coupling (Newton Rings) between the brightness enhancement films (e.g., 312 and 324). In addition, the top light-diffusing film 330 can also function as a protective film for the brightness enhancement films (312, 324); thereby reducing the likelihood of fracturing or damaging the prismatic surfaces of the brightness enhancement films. Furthermore, it is noted that top light-diffusing films (e.g., 330), i.e., the light-diffusing film nearest to the liquid crystal display (e.g., 322), can comprise a haze value of less than or equal to about 85%, more particularly a haze value of less than or equal to about 50%. Whereas, bottom light-diffusing films (e.g., 320), i.e., the light-diffusing film nearest the light guide (e.g., 306), generally comprise a haze value of greater than or equal to about 90%, more particularly a haze value of greater than or equal to about 95%.

It is noted that the percent haze can be predicted and calculated from the following equation:

$$\% \text{ Haze} = 100 \times \frac{\text{Total Diffuse Transmission}}{\text{Total Transmission}} \quad (1)$$

wherein total transmission is the integrated transmission; and the total diffuse transmission is the light transmission that is scattered by the film as defined by ASTM D1003. For example, a commercially-available hazemeter can be used, such as the BYK-Gardner Haze-Gard Plus, with the rough diffusing side of the film facing the detector.

Optical source (e.g., 102, 302) can include any light source suitable to backlight a liquid crystal display (LCD) device, which includes both high-brightness and low-brightness light sources. The high-brightness light source can include a cold cathode fluorescent lamp (CCFL), a fluorescent lamp, and the like. The low-brightness light source can include a light emitting diode (LED), and the like.

Light guide (e.g., 106, 306) preferably comprises a material that assumes a low internal absorption of the light, including an acrylic film and desirably transparent materials including acryl, PMMA (polymethylmethacrylate), polycarbonate, polyethylene, selenium (Se), silver chloride (AgCl), and the like. The shape of the light guide can be in a shape suitable for the desired transmission of the light, such as a bar, a curved surface, a plate, a sheet, and the like. The light guide can be a single sheet or a plurality of sheets.

Reflective film (e.g., 108, 308) can be in any usable shape for reflecting light, e.g., a planar shape, such as a plate, sheet, coating and the like, wherein the reflective film comprises a reflective material. For example, suitable reflective materials include an aluminum, a silver, titanium oxide, and the like, as well as combinations comprising at least one of the foregoing. In other embodiments, the reflective film can comprise a thermoplastic material, e.g., Spectralon® (available from Labsphere, Inc.), titanium-oxide pigmented Lexan® (available from General Electric Co.), and the like.

The brightness enhancement film(s) (e.g., 112, 212, 224, 312, and 324) comprise light-redirecting structure(s) (e.g., prismatic, (pyramid-like) cube corners, spheres, edges, and the like) to direct light along the viewing axis (i.e., normal to the display), which enhances the luminance (brightness) of the light viewed by the user of the display and allows the system to use less power to create a desired level of on-axis illumination. Generally, the brightness enhancement film comprises a base film that can comprise an optional curable coating disposed thereon. The light-redirecting structure can be created, for example, by applying the curable coating to the base film and casting the desired light-redirecting structure in the curable coating, by hot-embossing the structure directly onto the base film, or the like. The disposition of the light-redirecting structure(s) may negate or minimize the original texture on the base film by either matching the refractive indexes of the base film layer and the light-redirecting layer, and/or by melting the textured surface and reforming the first surface to impose light-redirecting properties.

While the base film material can vary depending on the application, suitable materials include those base film materials discussed in published U.S. Patent Application No. 2003/0108710 to Coyle et al. More specifically, the base film material of the brightness enhancement film can comprise metal, paper, acrylics, polycarbonates, phenolics, cellulose acetate butyrate, cellulose acetate propionate, poly(ether sulfone), poly(methyl methacrylate), polyurethane, polyester, poly(vinylchloride), polyethylene terephthalate, and the like, as well as blends copolymers, reaction productions, and combinations comprising at least one of the foregoing.

In one embodiment, the base film of the brightness enhancement film is formed from a thermoplastic polycarbonate resin, such as Lexan® resin, commercially available from General Electric Company, Schenectady, N.Y. Thermoplastic polycarbonate resin that can be employed in producing the base film, include without limitation, aromatic polycarbonates, copolymers of an aromatic polycarbonate such as polyester carbonate copolymer, blends thereof, and blends thereof with other polymers depending on the end use application. In another embodiment, the thermoplastic polycarbonate resin is an aromatic homo-polycarbonate resin such as the polycarbonate resins described in U.S. Pat. No. 4,351,920 to Ariga et al. These polycarbonate resins can be obtained by the reaction of an aromatic dihydroxy compound with a carbonyl chloride. Other polycarbonate resins can be obtained by the reaction of an aromatic dihydroxy compound with a carbonate precursor such as a diaryl carbonate. An exemplary aromatic dihydroxy compound is 2,2-bis(4-hydroxy phenyl) propane (i.e., Bisphenol-A). A polyester carbonate copolymer is obtained by the reaction of a dihydroxy phenol, a carbonate precursor and dicarboxylic acid such as terephthalic acid or isophthalic acid or a mixture of terephthalic and isophthalic acid. Optionally, an amount of a glycol can also be used as a reactant.

In other embodiments, an anti-static material can optionally be added to the base film of the brightness enhancement film in an amount sufficient to impart anti-static properties to the film. For example, an anti-static material comprising phosphonium sulfonate can be added to a base film comprising polycarbonate. In an embodiment, the anti-static material is that described in U.S. Pat. No. 6,194,497 to Henricus et al. More specifically, the phosphonium sulfonate can be a fluorinated phosphonium sulfonate comprising a fluorocarbon containing an organic sulfonate anion and an organic phosphonium cation. Examples of such organic sulfonate anions include, but are not limited to, perfluoro methane sulfonate, perfluoro butane sulfonate, perfluoro hexane sulfonate, perfluoro heptane sulfonate, and perfluoro octane sulfonate. Examples of the phosphonium cation include, but are not limited to, aliphatic phosphonium such as tetramethyl phosphonium, tetraethyl phosphonium, tetrabutyl phosphonium, triethylmethyl phosphonium, tributylmethyl phosphonium, tributylethyl phosphonium, trioctylmethyl phosphonium, trimethylbutyl phosphonium, trimethyloctyl phosphonium, trimethyllauryl phosphonium, trimethylstearyl phosphonium, triethyloctyl phosphonium and aromatic phosphoniums such as tetraphenyl phosphonium, triphenylmethyl phosphonium, triphenylbenzyl phosphonium, tributylbenzyl phosphonium. More specifically, the fluorinated phosphonium sulfonate can be obtained by any combination comprising at least one of any of these organic sulfonate anions with phosphonium cations.

Furthermore, even more specifically, the phosphonium sulfonate employed herein can be a fluorinated phosphonium sulfonate having the general formula:

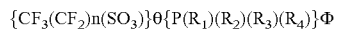

$\{CF_3(CF_2)n(SO_3)\}\theta\{P(R_1)(R_2)(R_3)(R_4)\}\Phi$ wherein F is fluorine; n is an integer of from 1–12, S is sulfur; $R_1$, $R_2$, and $R_3$ can each comprise an aliphatic hydrocarbon radical of 1–8 carbon atoms or an aromatic hydrocarbon radical of 6–12 carbon atoms and $R_4$ is a hydrocarbon radical of 1–18 carbon atoms. Anti-static compositions comprising fluorinated phosphonium sulfonate shown by formula as having the principle component thereof can be used in many different ways to make use of their anti-static and compatibility characteristics and heat resistance in providing such anti-static characteristics to polycarbonate. The phosphonium fluorocarbon sulfonate salts are low melting semi-solid materials, and as such, they can be handled as a molten liquid. Some embodiments are solid crystalline materials at room temperature (i.e., a temperature of about 15° C. to about 25° C.) and are easy to weigh, handle, and add to the polycarbonate.

While the anti-static material can be added to the polycarbonate at any time in the process, it is desirable to add it to the polycarbonate at the time of polymer production. For example, the polycarbonate and anti-static material can be processed by, for example, extrusion, and the like.

As briefly mentioned above, the base film of the brightness enhancement film can comprise polycarbonate and an anti-static material. For example, the base film comprises greater than or equal to about 80 wt. % polycarbonate, and more particularly greater than or equal to about 90 wt. % polycarbonate, wherein weight percents are based on a total weight of the base film. For example, in an embodiment, the base film comprises about 93 wt. % to about 99.6 wt. % polycarbonate; and about 0.4 wt. % to about 7 wt. % anti-static material, more specifically, about 0.4 wt. % to about 2 wt. % anti-static material.

While it is noted that the thickness of the base film of the brightness enhancement film can vary depending on the desired application, the base film can comprise a thickness sufficient for use in a flat panel display, e.g., for use in a laptop computer. For example, the base film can comprise a thickness of about 25 micrometers to about 1,000 micrometers, specifically about 175 micrometers to about 750 micrometers.

In embodiments comprising a curable coating on the base film of the brightness enhancement film, the curable coating comprises a curable composition, which generally comprises a polymerizable compound. Polymerizable compounds, as used herein, are monomers or oligomers comprising one or more functional groups capable of undergoing radical, cationic, anionic, thermal, and/or photochemical polymerization. Suitable functional groups include, for example, acrylate, methacrylate, vinyl, epoxide, and the like.

For example, the curable composition can include monomeric and dimeric acrylates, for example, cyclopentyl methacrylate, cyclohexyl methacrylate, methylcyclohexylmethacrylate, trimethylcyclohexyl methacrylate, norbornylmethacrylate, norbornylmethyl methacrylate, isobornyl methacrylate, lauryl methacrylate 2-ethylhexyl methacrylate, 2-hydroxyethyl methacrylate, hydroxypropyl acrylate, hexanediol acrylate, 2-phenoxyethyl acrylate, 2-hydroxyethyl acrylate, 2-hydoxypropyl acrylate, diethyleneglycol acrylate, hexanediol methacrylate, 2-phenoxyethyl methacrylate, 2-hydroxyethyl methacrylate, 2-hydoxypropyl methacrylate, phenylthiol ethylacrylate, diethyleneglycol methacrylate, ethylene glycol dimethacrylate, ethylene glycol diacrylate, propylene glycol dimethacrylate, propylene glycol diacrylate, allyl methacrylate, allyl acrylate, butanediol diacrylate, butanediol dimethacrylate, 1,6hexanediol diacrylate, 1,6-hexanediol dimethacrylate, diethyleneglycol diacrylate, trimethylpropane triacrylate, pentaeryritol tetraacrylate, hexanediol dimethacrylate, diethyleneglycol dimethacrylate, trimethylolpropane triacrylate, trimethylpropane trimethacrylate, pentaeryritol tetramethacrylate, and combinations comprising at least one of the foregoing acrylates.

Additionally, the curable composition can comprise a polymerization initiator to promote polymerization of the curable components. Suitable polymerization initiators include photoinitiators that promote polymerization of the components upon exposure to ultraviolet radiation. Suitable photoinitiators include, but are not limited to benzophenone and other acetophenones, benzil, benzaldehyde and O-chlorobenzaldehyde, xanthone, thioxanthone, 2-chlorothioxanthone, 9,10-phenanthrenenquinone, 9,10-anthraquinone, methylbenzoin ether, ethylbenzoin ether, isopropyl benzoin ether, 1-hydroxycyclohexyphenyl ketone, α,α-diethoxyacetophenone, α,α-dimethoxyacetoophenone, 1-phenyl-,1,2-propanediol-2-o-benzoyl oxime, 2,4,6-trimethylbenzoyldiphenyl phosphine oxide, and, α,α-dimethoxy-α-phenylacetopheone, as well as combinations comprising at least one of the foregoing. In one embodiment, the polymerization initiator is present in an amount of about 0.1 wt. % to about 10 wt. %, more specifically about 1 wt. % to about 8 wt. %, wherein weight percents are based upon a total weight of the curable composition.

In an embodiment, the curable composition comprises multifunctional (meth)acrylates, substituted or unsubstituted aryleth (meth)acrylate monomer, brominated aromatic (meth)acrylate monomer, and polymerization initiator. The curable coating has a refractive index of greater than or equal to about 1.4, more specifically greater than or equal to about 1.6. The refractive index of the curable coating can be increased by including metal oxide nanoparticles in the curable composition. Examples of suitable metal oxides include, but are not limited to, titanium oxide, antimony oxide, zinc oxide, indium tin oxide, indium oxide, tin oxide, cadmium tin oxide, and combinations comprising at least one of the forgoing oxides. Further, suitable metal oxide nanoparticles and methods for their preparation are also described, for example, in U.S. Pat. No. 6,261,700 to Olson et al. and U.S. Pat. No. 6,291,070 to Arpac et al. For example, metal oxide nanoparticles can be prepared by a method comprising hydrolyzing a metal alkoxide with an acidic alcohol solution, wherein the acidic alcohol solution comprises an alkyl alcohol, water, and an acid to form a first sol comprising metal oxide nanoparticles; treating the first sol (i.e., a colloidal solution) with an organosilane to form a second sol comprising treated metal oxide nanoparticles; and treating the second sol with an organic base in an amount of about 0.1:1 to about 0.9:1 molar ratio of organic base to acid to form a third sol comprising treated metal oxide nanoparticles. The metal of the metal alkoxide can be, for example, titanium, antimony, zinc, indium, tin, cadmium, and combinations comprising at least one of the foregoing. The alkoxide of the metal alkoxide can be, for example, a linear or branched $C_1$–$C_{12}$ alkoxide.

The curable coating can comprise a thickness of about 10 micrometers to about 100 micrometers, specifically about 35 micrometers to about 100 micrometers, and more specifically about 60 micrometers to about 80 micrometers.

As will be discussed in greater detail, it has been discovered that a flat panel display comprising no color bands and/or shadows (when viewed from all viewing angles in a display device with the backlight on) can be obtained when a brightness enhancement film is employed in the flat panel display, wherein the base film of the brightness enhancement film comprises a base film with a low stress retardation variation. Stress retardation can be measured using, for example, a SCA1500 System from Strainoptic Technologies (now Strainoptic, Inc.) according to ASTM D4093. Stated another way, the stress retardation gradient is the first derivative of the stress retardation profile.

A low stress retardation variation base film can be defined mathematically as a film comprising a low stress retardation gradient from a stress retardation profile (i.e., stress retardation as a function of location within the film), wherein a stress retardation gradient is less than or equal to 50 nanometers per inch (nm/in), more particularly less than or equal to 30 nm/in, still more particularly less than or equal to 15 nm/in. The stress retardation gradient is determined at intervals of less than 1 inch (i.e., $C_1$–$C_2$ is less than 1 inch (See the formula below)), or, more particularly, at intervals of less than or equal to about 0.75 inches, or, even more particularly, at intervals of less than or equal to about 0.5 inches, and yet more particularly, at intervals of less than or equal to about 0.25 inches. The stress retardation gradient is affected by the stress retardation as well as the distance between the measured points. The stress retardation gradient can be determined between two points by the following formula:

$$SRG = \left| \frac{(S_1 - S_2)}{C_1 - C_2} \right|$$

where:
  SRG is the stress retardation gradient
  $S_1$ is the stress retardation at point 1
  $S_2$ is the stress retardation at point 2
  $C_1$ is the location of point 1
  $C_2$ is the location of point 2

For a example, if point 1 has an SR value of 15 nm, point 2 has an SR value of 35 nm, with a distance between point 1 and point 2 of 0.25 inches, the SRG between A and B will be |(15−35)/0.25| which is 80 nm/in.

FIG. 9 is a graphical illustration of stress retardation and stress retardation gradient measured on a 15 in (38 cm) wide, 7 mil (0.18 mm) thick polish/polish PC film. As can be seen in FIG. 9, there were two locations where the stress retardation value was less than 50 nm but the stress retardation gradient was greater than 50 nm/in.

Without being bound by theory, suitable low stress retardation variation base films used to produce brightness enhancement films that when employed in a display device do not produce color bands, include but is not limited to, base films comprising a first surface (i.e., the surface of the brightness enhancement film that faces toward a LCD when employed in a flat panel display, more particularly the surface of the brightness enhancement film that faces toward the user of the device) comprising a textured surface, e.g., a matte surface. Further, in an embodiment, the base film comprises a second surface (i.e., the back surface; the surface that faces toward the light guide, more particularly the surface that faces away from the user of the device), which can comprise a polished surface.

For example, suitable base films include, but are not limited to, base films comprising a first surface comprising a texture (e.g., matte surface, a velvet surface, and the like); and a second surface comprising a polish surface, wherein the light-redirecting structures are disposed in a coating on the first surface of the base film, wherein the resulting base film is a low stress retardation variation base film comprising a stress retardation gradient less than or equal to 50 nanometers per inch (nm/in), as measured in intervals of less than or equal to 1 inch, as discussed above.

The terms "polish", "matte", and "velvet" are all terms readily understood by those skilled in the art. For example, a polish surface can comprise an average surface roughness (Ra) of less than about 0.1 micrometers (or, more specifically, less than or equal to about 0.05 micrometers); a matte (e.g., fine matte, medium matte, course matte, and the like) surface generally comprises a surface roughness (Ra) of about 0.1 micrometers to 2.2 micrometers (or, more specifically, about 0.3 micrometers to about 2.2 micrometers); and a velvet surface can comprise a surface roughness (Ra) greater than 2.2 micrometers. Generally, the Ra is a measure of the average roughness of the film. It can be determined by integrating the absolute value of the difference between the surface height and the average height and dividing by the measurement length for a one dimensional surface profile, or the measurement area for a two dimensional surface profile. More particularly, surface roughness can be measured using a Serfcorder SE4000K, commercially available from Kosaka Laboratory Ltd., wherein the surface roughness is measured according to ASME B46.1–1995.

Additionally, it is noted that embodiments of the brightness enhancement film disclosed herein comprise a brightness performance equivalent to a brightness enhancement film comprising polish/polish surfaces. For example, all else being equal (e.g., same base film materials, prismatic structures, etc.) the brightness enhancement film comprising matte/polish surfaces can comprise a relative luminance of about 99.5% to about 100.5% compared to a base film comprising polish/polish surfaces. The base films (the diffusing film) can comprise a haze value of less than or equal to about 90%, or more specifically, about 10% to about 85%, or, even more specifically, about 20% to about 80%, or, yet more specifically, about 30% to about 80%, and even more specifically, about 35% to about 65%. The transmission can be greater than or equal to about 85%, or, more specifically, greater than or equal to about 89%. For example, the diffusing film can have a haze value of about 20% to about 80% as measured according to ASTM D1003, and a transmission of greater than or equal to about 85%. In another embodiment, the diffusing film can have a haze value of less than or equal to about 55% as measured according to ASTM D1003, and a transmission of greater than or equal to about 89%.

In an embodiment of making a brightness enhancement film, the method comprises forming a base film by feeding a thermoplastic resin(s) (e.g., polycarbonate resin) to an extruder; melting the thermoplastic resin to a temperature greater than or equal to the glass transition temperature (Tg) of the thermoplastic resin while it advances through the extruder; extruding the resulting molten resin through a die into a nip or gap between two calendering rolls; and cooling the resulting film to below its glass transition temperature. The resulting film can be rolled and stored for subsequent processing (e.g., coating and casting, embossing, and the like). Alternatively, the base film can be feed directly to a coating and casting station, embossing station, and the like.

In an embodiment, the molten thermoplastic resin used to produce the base film of the brightness enhancement film is passed through two calendering rolls such that the resulting base film is a low stress retardation variation base film comprising a stress retardation gradient less than or equal to 50 nanometers per inch (nm/in). Without being bound by theory, a low stress variation base film can be obtained when at least one calendering roll employed comprises a material comprising a hardness suitable for producing the low stress retardation variance base film. For example, the roll(s) can comprise an elastomeric material (e.g., an EPDM (ethylene propylene diamine monomer) based rubber, a silicone-based rubber, and so forth). It is noted that in various embodiments the roll can be made entirely of the elastomeric material. Alternatively, the elastomeric material can be disposed on an outer surface of the roll, i.e., the surface of the roll that is in physical communication with the base film.

For example, in making the base film, a textured rubber calendering roll can be employed to texture the first surface of the base film, as discussed above (e.g., the surface is a matte surface). In various embodiments, the second surface can have a polished surface. Embodiments comprising a polished second surface and a matte first surface can advantageously produce a brightness enhancement film comprising a luminance (brightness) equivalent to the luminance as a polish/polish film without color bands and with reduced retardation gradients.

In various other embodiments, one of the calendering roll can comprise a chrome or chromium plated roll comprising a polished surface or texture surface (e.g., a velvet surface). Furthermore, it is generally noted that the size of the rollers, material of the rollers, number of rollers, the film wrap around the rollers, and the like can vary with the system employed. Further, it is noted that processing conditions (e.g., the temperature of the calendering rollers, the line speed, nip pressure, and the like) are controlled to produce the desired haze value and luminance in the base film for the resulting brightness enhancement film.

Figure 8:
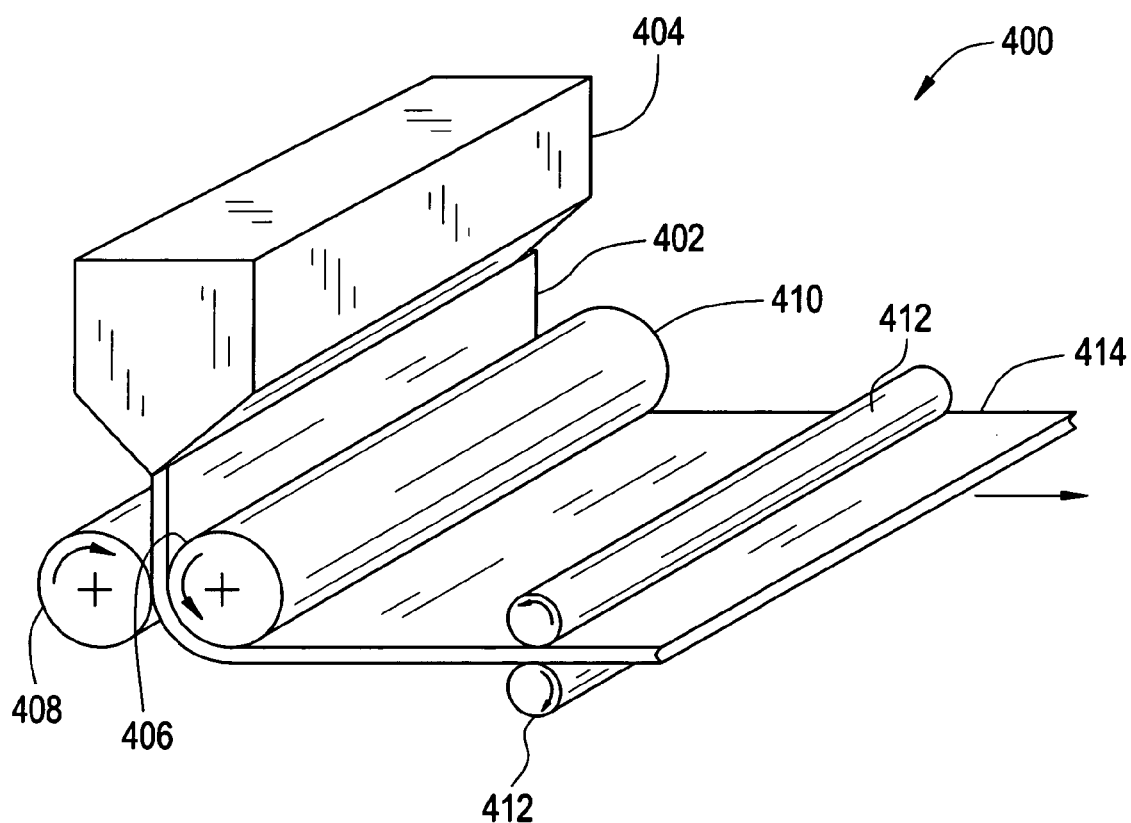
FIG. 8 is a schematic view of an extrusion system for producing a base film for a brightness enhancement film.

Referring to FIG. 8, a schematic view of an exemplary extrusion system, generally designated 400 is illustrated. Molten thermoplastic resin 402 is extruded from slot die 404. The molten thermoplastic resin is then passed through a nip or gap 406 formed by calendering rolls 408 and 410, is cooled, and is then passed through pull rolls 412. The cooled film can be rolled (stored) to be subsequently processed, or the cooled film can feed directly to a station (device) to form the light-redirecting structure on the cooled film (base film) to form the brightness enhancement film (e.g., a coating and casting station, embossing station, and the like).

Having formed the base film of the brightness enhancement film, the method of making the brightness enhancement film further comprises creating light-redirecting structure(s) on the first surface of base film, i.e., the surface comprising the matte surface. As briefly noted above, the light-redirecting structure (e.g., prismatic structure) can be created by applying a curable coating onto the first surface of the base film and casting the structure into the curable coating as it is curing, by hot-embossing the structure onto the base film, or the like. For example, prismatic structures can be formed by disposing a curable coating on the base film, and curing the coating (e.g., by exposing the coating to ultra violet (UV) radiation) while the coating is in physical communication with a cast, wherein the cast comprises the negative image of the desired surface structure.

Methods of coating a curable composition on a surface of a substrate are described, for example, in U.S. Pat. No. 5,175,030 to Lu et al., U.S. Pat. No. 5,183,597 to Lu, U.S. Pat. No. 5,271,968 to Coyle et al., U.S. Pat. No. 5,468,542 to Crouch, U.S. Pat. No. 5,626,800 to Williams et al., and U.S. Pat. No. 6,280,063 to Fong et al., as well as U.S. Patent Application Publication No. 2003/0108710 A1 to Coyle et al. For example, suitable methods of disposing the coating in physical communication with the first surface of the brightness enhancement film include, but is not limited to, spraying, brushing, electro-deposition, dipping, flow coating, roll coating, gravure, and screen printing. Moreover, it is noted that coating can be applied as continuous coating or as patches that correspond with a pattern on the cast.

In other embodiments, the light-redirecting structures can be formed by hot-embossing the base film, wherein the method comprises heating the base film to a temperature sufficient to soften the base film, and embossing the desired structure into the base film. It is noted that roll embossing, stamping, or the like can be employed to emboss the light-redirecting structure (e.g., prism(s)) into the base film. More particularly, the embossing tool comprises a negative image of the desired surface.

For protection and convenience of handling in between preparation of brightness enhancement film and its incorporation into a device, the brightness enhancement film can additionally/optionally comprise a masking layer(s). For example, the brightness enhancement film can comprise a masking layer disposed over the first surface of the film (e.g., in embossed embodiments), the second surface of the base film, and/or the curable coating (e.g., in coated embodiments). Suitable masking layers include single or co-extruded layers of polyethylene, polypropylene, polyester, and combinations comprising at least one of the foregoing, wherein the adhesion to the brightness enhancement film is controlled by a pressure sensitive adhesive, by static, and/or the like.

With regards to the light-diffusing film (e.g., 120) of the backlight display device, the light-diffusing film can be a textured light-diffusing film and/or a bulk light-diffusing film (e.g., light-diffusing can be imbedded into the film to impart the light-diffusing properties to the film). Generally, the light-diffusing film comprises a thermoplastic substrate such as polyester, polycarbonate, or combinations comprising the foregoing. As noted above, the haze value for the light-diffusing film can vary depending on the application. For example, it is noted that top light-diffusing films (e.g., 330) can comprise a haze value of less than or equal to about 85%, more particularly a haze value of less than or equal to about 50%. Whereas, bottom light-diffusing films (e.g., 320) generally comprise a haze value of greater than or equal to about 90%, more particularly a haze value of greater than or equal to about 95%.

As briefly mentioned above, the brightness enhancement films disclosed herein can be employed in various backlight display devices, e.g., a laptop computer.

EXAMPLES

Comparative Example 1

Polycarbonate resins were extruded at 270° C. into base films comprising a thickness of about 175 micrometers. The film was extruded between two polished chrome calendering rolls maintained at 127° C. A base film was achieved with stress retardation gradient greater than 50 nanometers per inch retardation across a 50 inch (127 centimeter) wide film. It is noted that in constructing a stress profile from which the stress retardation gradient was obtained, stress retardation was measured at every 0.25 inches (0.64 centimeters) across the length of the film.

This base film was then coated with a coating comprising about 60 wt. % brominated epoxy acrylate, and about 40 wt. % phenylthiolethylacrylate, with a trace amount of a photoinitiator (i.e., a bis(acyl)phosphine oxide sold as IRGACURE 819, commercially available from Ciba Geigy, Inc., wherein weight percents were based on a total weight of the coating. The coating composition was applied to the bottom-masked base film by gravure roll at a thickness of about 30 micrometers. After the coating was applied to the film, prismatic structures were formed by curing the coating while it was in contact with a mold comprising a surface with the negative image of the desired surface structures as described above. The film was then masked, and subsequently converted into a format suitable for handling and assembly in a backlight module in a liquid crystal display. Color-band was observed when this coated film was assembled in a back light display device and covered rather by crossed polarizer films or by an LCD panel.

Example 2

Polycarbonate resins were extruded at 270° C. into base films comprising a thickness of about 175 micrometers. The film was extruded between a polished chrome calendering roll maintained at 127° C. and a steel calendering roll coated with 0.5 inch (about 1.3 cm) thick, 70 durometer (Shore A) silicone rubber calendering roll cooled with water at temperature of 43° C. A base film was achieved with stress retardation gradient less than 20 nanometers per inch retardation and 40% haze at a line speed of 19 feet per minute (ft/min) (about 5.8 meters per min (m/min)). It is noted that in constructing a stress profile from which the stress retardation gradient was obtained, stress retardation was measured at every 0.25 inches (0.64 centimeters) across the length of the film.

This base film was then coated with a coating comprising about 60 wt. % brominated epoxy acrylate, and about 40 wt. % phenylthiolethylacrylate, with a trace amount of a photoinitiator (i.e., a bis(acyl)phosphine oxide sold as IRGACURE 819, commercially available from Ciba Geigy, Inc., wherein weight percents were based on a total weight of the coating. The coating composition was applied to the bottom-masked base film by gravure roll at a thickness of about 30 micrometers. After the coating was applied to the film, prismatic structures were formed by curing the coating while it was in contact with a mold comprising a surface with the negative image of the desired surface structures as described above. The film was then masked, and subsequently converted into a format suitable for handling and assembly in a backlight module in a liquid crystal display. Substantially the same luminance was obtained after replacing a brightness enhancement film made from a polish/polish base film in a backlight display device with a brightness enhancement film comprising a matte/polish base film. More particularly, the luminance at a zero degree view angle (i.e., on-axis) was measured (with the liquid crystal panel removed from a backlight display device) using an Eldim EZ Contrast 160D instrument, and found to be about 102% to about 104% of the value obtained when a commercial brightness enhancement film was used, i.e., a BEF II film commercially available from 3M, Inc. No color-band was observed when this coated film was assembled in a back light display device and covered by crossed polarizer films.

Example 3

Polycarbonate resins and an antistatic agent tetrabutylphosphonium perfluorobutylsulfonate ("FC-1") present in an amount of about 1.1 wt. % based on a total weight of the blend were extruded at 263° C. into base films comprising a thickness of about 125 micrometers. The film was extruded between a polished chrome calendering roll maintained at 135° C. and a steel calendering roll coated with 0.5 inch (about 1.3 cm) thick, 70 durometer (Shore A) silicone rubber calendering roll cooled with water at a temperature of 40° C. A base film was achieved with less than 15 nm/in stress retardation gradient and 40% haze at a line speed of 16 feet per minute (ft/min) (about 4.9 meters per min (m/min)). A coating was applied in the same manner and using the same coating material as discussed in Example 1. In this example however, the surface static decay of the resulting film decreased by 3 to 4 orders of magnitude. The film was masked, and subsequently converted into a format suitable for handling and assembly in a backlight module in a liquid crystal display. Substantially the same luminance was obtained after replacing a brightness enhancement film made from a polish/polish base film in a backlight display device with a brightness enhancement film comprising a matte/polish base film. No color-band was observed when this coated film was assembled in a back light display device and covered by polarizer films.

Example 4

Polycarbonate resins and an antistatic agent tetrabutylphosphonium perfluorobutylsulfonate ("FC-1") present in an amount of about 1.1 wt. % based on a total weight of the blend were extruded at 263° C. into base films comprising a thickness of about 125 micrometers. The film was extruded between a velvet steel calendering roll maintained at 135° C. and a steel calendering roll coated with 0.5 inch (about 1.3 cm) thick, 70 durometer (Shore A) silicone rubber calendering roll cooled with water at a temperature of 40° C. A base film was achieved with less than 15 nm/in stress retardation gradient and 45% haze at a line speed of 12 feet per minute (ft/min) (about 3.7 meters per min (m/min)). The base film had a matte surface on a first surface and a velvet texture on a second surface. The first surface of the base film was then coated with a coating comprising about 60 wt. % brominated epoxy acrylate, and about 40 wt. % phenylthiolethylacrylate, with a trace amount of a photoinitiator (e.g., same as that discussed above in Example 1), wherein weight percents are based on a total weight of the coating. After the coating was applied to the film, prismatic structures were formed by curing the coating while it was in contact with mold comprising a surface with the negative image of the desired surface structures as described above. The film was then masked, and subsequently converted into a format suitable for handling and assembly in a backlight module in a liquid crystal display.

It was noted that in a backlight module, most defects (scratches, point defects, ripples, and the like) generated during current processing and handling conditions, which were visible in a polish/polish base film, were not visible in this textured base film. Additionally, the luminance at a zero degree view angle (i.e., on-axis) was measured (with the liquid crystal panel removed from a backlight display device) using an Eldim EZ Contrast 160D instrument, and found to be about 92% of the value obtained when a commercial brightness enhancement film was used, i.e., a BEF II film commercially available from 3M, Inc. Grid lines from light guide were not visible after replacing a bottom diffuser with the brightness enhancement film described above. Additionally, it is noted that similar results were also obtained when the second surface comprised a matte surface.

Advantageously, embodiments of the brightness enhancement films disclosed herein do not produce color bands when employed in a flat panel display device (e.g., a backlight display devices), and perform equivalent to a polish/polish. For example, it is noted that color bands were observed in comparative example 1, but not color bands were observed in Examples 2–4. Additionally, it is noted that embodiments are disclosed herein wherein the brightness enhancement films comprising a base film comprising matte/polish surfaces can comprise a relative luminance of about 99.5% to about 100.5% compared to a base film comprising polish/polish surfaces. In other words, the brightness enhancement films disclosed herein comprise substantially the same brightness performance as a polish/polish film, but have the advantage of not producing color bands.

Additionally, it is noted that embodiments are disclosed herein comprising anti-static agent. As noted above, the static decay can be decrease by 3 to 4 orders of magnitude compared to embodiments not comprising the anti-static agent.

Furthermore, in various embodiments, the base film of the brightness enhancement film comprises polycarbonate, e.g., the base film comprise greater than or equal to about 80 wt. % polycarbonate, and more particularly greater than or equal to about 90 wt. % polycarbonate, wherein weight percents are based on a total weight of the base film. Compared to commercially available brightness enhancement films comprising polyethylene terephthalate (PET), the brightness enhancement films disclosed herein comprising polycarbonate have superior long-term stability. For example, in a thermal cycle test, a polycarbonate base film can out perform the PET base film, i.e., the film flatness of the polycarbonate can remain more flat compared to the PET film. Generally, in the thermal cycle test, a base film is placed in a chamber where the temperature is cycled between 85° C. and −35° C. (minimal moisture content in the air, e.g., less than or equal to 60% relative humidity), with the temperature held at each extreme for 1 hour and then changed to the other extreme at a rate of 2° C. per minute. Generally, 100 such cycles are run and then the base films are compared.

The brightness enhancement or collimating film disclosed herein uses a diffusing base film with a microstructured coating on the front surface (a random textured surface) to form a collimating film. The diffusing film has a textured front surface that spreads light that passes from the back surface through the film. In other words, the diffusing film diverges the light entering the back of the film. The collimating film rotates the average direction of and converges the light entering the back of the film.

The collimating film is formed by coating the front of the diffusing film and disposing collimating microstructures (e.g., prisms) in the coating. This coating can have a refractive index that is similar to the refractive index of the diffusing film (base film). For example, the difference in refractive index between the diffusing film and the coating can be less than or equal to about ±0.5, or, more specifically, less than or equal to about ±0.2, or, even more specifically, less than or equal to about ±0.1, and yet more specifically, less than or equal to about ±0.06.

Collimating films that have a polished surface into which the prisms are disposed can have a high stress retardation gradient (greater than 50 nm/in), even with a low stress retardation (less than 50 nm). The collimating films disclosed herein have a low stress retardation gradient, i.e., less than 50 nm/in as measured in intervals of less than or equal to 1 inch, and a low stress retardation (less than 50 nm). These films convert a diffusing film into a collimating film, thereby benefiting from the ability to produce a low stress retardation gradient and enabling the formation of a film that collimates light as desired.

It should further be noted that the terms "first," "second," and the like herein do not denote any order, quantity, or importance, but rather are used to distinguish one element from another, and the terms "a" and "an" herein do not denote a limitation of quantity, but rather denote the presence of at least one of the referenced item. The term "about", when used in conjunction with a number in a numerical range, is defined being as within one standard deviation of the number "about" modifies. The suffix "(s)" as used herein is intended to include both the singular and the plural of the term that it modifies, thereby including one or more of that term (e.g., the bearings(s) includes one or more bearings). The endpoints of all ranges directed to the same component or property are inclusive and independently combinable (e.g., ranges of "up to about 5°, or, more specifically, about 0.5° to about 3°" is inclusive of the endpoints and all intermediate values of the ranges of "about 0.5° to about 5°," etc.). The notation "±10%" means that the indicated measurement may be from an amount that is minus 10% to an amount that is plus 10% of the stated value.

While the invention has been described with reference to several embodiments thereof, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A brightness enhancement film, comprising:
a diffusing film comprising a front surface and a back surface;
a coating on the front surface, and
light redirecting structures disposed in the coating;
wherein the brightness enhancement film is capable of collimating light, and wherein, without the coating, the diffusing film would be capable of spreading light passing through the back surface.

2. The film of claim 1, wherein the diffusing film has a stress retardation gradient of less than or equal to 50 nm/in, wherein an interval for calculation of the stress retardation gradient is less than 1 inch.

3. The film of claim 2, wherein the stress retardation gradient less than or equal to 30 nm/in.

4. The film of claim 3, wherein the stress retardation gradient is less than or equal to 15 nm/in.

5. The film of claim 2, wherein the interval is less than or equal to about 0.75 inches.

6. The film of claim 5, wherein the interval is less than or equal to about 0.5 inches.

7. The film of claim 6, wherein the interval is less than or equal to about 0.25 inches.

8. The film of claim 1, wherein the first surface had an average surface roughness of greater than or equal to about 0.1 micrometers.

9. The film of claim 8, wherein the average surface roughness was about 0.1 to about 2.2 micrometers.

10. The film of claim 1, wherein the back surface has an average surface roughness (Ra) of less than or equal to 0.05 micrometers.

11. The film of claim 1, wherein the diffusing film comprises a haze value of about 20% to about 80% as measured according to ASTM D1003, and a transmission of greater than or equal to about 85%.

12. The film of claim 11, wherein the diffusing film comprises a haze value of about 35% to about 65% as measured according to ASTM D1003.

13. The film of claim 1, wherein the coating has a refractive index of greater than or equal to about 1.4.

14. The film of claim 1, wherein a difference in a diffusing film refractive index and a coating refractive index is less than or equal to about ±0.2.

15. The film of claim 14, wherein the difference is less than or equal to about 0.1.

16. The film of claim 15, wherein the difference is less than or equal to of about 0.06.

17. The film of claim 1, wherein the diffusing film comprises polycarbonate and phosphonium sulfonate.

18. The film of claim 17, wherein the diffusing film comprises about 93 wt. % to about 99.6 wt. % polycarbonate and about 0.4 wt. % to about 7 wt. % fluorinated phosphonium sulfonate, based on a total weight of the base film.

19. The film of claim 1, wherein the light-redirecting structure comprises a plurality of prisms each comprising a peak comprising a pitch and a radius of curvature of about 0.1% to about 30% of the pitch.

20. The film of claim 1, wherein the diffusing film comprises greater than or equal to about 80 wt. % polycarbonate, based on a total weight of the thermoplastic base film, and wherein the stress retardation gradient is less than or equal to 15 nnilin.

21. A display device, comprising:
the brightness enhancement film of claim 1;
an optical source; and
a light guide in optical and physical communication with the optical source.

22. A brightness enhancement film, comprising:
a diffusing film comprising a front surface and a back surface, wherein the diffusing film has a stress retardation gradient of less than or equal to 50 nm/in, wherein an interval for calculation of the stress retardation gradient is less than 1 inch;
a coating on the front surface; and
light redirecting structures disposed in the coating;
wherein the brightness enhancement film is capable of collimating light.

23. A brightness enhancement film, comprising:
a diffusing film comprising a front surface, a back surface, and a diffusing film refractive index, wherein the front surface comprises an average surface roughness (Ra) of greater than or equal to about 0.1 micrometers;
a coating on the front surface, wherein the coating has a coating refractive index; and
light redirecting structures disposed in the coating;
wherein the brightness enhancement film is capable of collimating light; and
wherein a difference in the diffusing film refractive index and the coating refractive index is less than or equal to about ±0.2.

24. A method of making a brightness enhancement film, comprising:
melting a thermoplastic resin at a temperature greater than or equal to a glass transition temperature of the thermoplastic resin;
extruding the thermoplastic resin into a gap between a first calendering roll and a second calendering roll;
cooling the thermoplastic resin to a temperature below the glass transition temperature to produce a diffusing film;
disposing a coating on a front surface of the diffusing film;
disposing a light-redirecting structures into the coating; and
curing the coating;
wherein the brightness enhancement film is capable of collimating light, and wherein, prior to disposing the coating on the front of the diffusing film, the diffusing film was capable of spread light passing through a back surface.

25. A method of making a brightness enhancement film, comprising:
melting a thermoplastic resin at a temperature greater than or equal to a glass transition temperature of the thermoplastic resin;
extruding the thermoplastic resin into a gap between a first calendering roll and a second calendering roll;
cooling the thermoplastic resin to a temperature below the glass transition temperature to produce a diffusing film, wherein a stress retardation gradient across the diffusing film is less than or equal to 50 nanometers per inch, wherein an interval for calculation of the stress retardation gradient is less than 1 inch;
disposing a coating on a front surface of the diffusing film;
disposing a light-redirecting structures into the coating; and
curing the coating;
wherein the brightness enhancement film is capable of collimating light.

* * * * *